United States Patent [19]

Imaizumi

[11] Patent Number: 4,645,043
[45] Date of Patent: Feb. 24, 1987

[54] HYDRAULIC DAMPER OF ADJUSTABLE DAMPING FORCE TYPE

[75] Inventor: Tomio Imaizumi, Kanagawa, Japan
[73] Assignee: Tokico Ltd., Kanagawa, Japan
[21] Appl. No.: 746,771
[22] Filed: Jun. 19, 1985
[30] Foreign Application Priority Data Jun. 20, 1984 [JP] Japan .............................. 59-126679

[51] Int. Cl.$^4$ .............................................. F16F 9/34
[52] U.S. Cl. ............................ 188/319; 137/512.15; 137/516.11; 188/322.15; 251/310
[58] Field of Search .................. 188/319, 285, 299; 137/516.11, 860, 512.1, 512.15, 614.17; 251/310

[56] References Cited

U.S. PATENT DOCUMENTS

| 1,265,153 | 5/1918 | Winsor ............................... 137/860 |
| 4,463,839 | 8/1984 | Ashiba ........................... 188/319 X |

FOREIGN PATENT DOCUMENTS

| 571092 | 2/1933 | Fed. Rep. of Germany ...................... 137/512.15 |
| 525481 | 6/1921 | France ............................. 137/512.1 |
| 1224765 | 6/1960 | France ........................... 137/512.15 |
| 40034 | 3/1984 | Japan ............................. 188/322.15 |
| 753490 | 7/1956 | United Kingdom ........... 188/322.14 |

*Primary Examiner*—George E. A. Halvosa
*Attorney, Agent, or Firm*—Wenderoth, Lind & Ponack

[57] ABSTRACT

A hydraulic damper of adjustable damping force type includes a cylinder containing hydraulic liquid, a piston working in the cylinder and partitioning the interior thereof into two liquid chambers and having thereon a damping force generating mechanism, a piston rod connected to the piston and extending through one of the liquid chambers to the outside of the cylinder, a coaxial bore formed in the piston rod, a liquid passage communicating the two liquid chambers independently from the damping force generating mechanism and including at least a portion of the bore in the piston rod, an adjusting rod inserted into the coaxial bore and rotatable from the outside of the damper, and a rotary valve secured to the adjusting rod and having a plurality of circumferentially spaced and radially extending orifices for selectively changing the effective passage area of the liquid passage. A check valve on the inner circumference of the rotary valve rotates integrally therewith in the circumferential direction. Circumferentially spaced and radially extending orifices are formed in the check valve at the locations aligned and have orifices in the rotary valve with the passage areas smaller than corresponding orifices in the rotary valve. The check valve opens to permit the liquid flow through selected orifices during either one of contraction and extension strokes of the damper and closes during the other of the contraction and extension strokes of the damper.

4 Claims, 8 Drawing Figures

HYDRAULIC DAMPER OF ADJUSTABLE DAMPING FORCE TYPE

BACKGROUND OF THE INVENTION

This invention relates to a hydraulic damper of the adjustable damping force type particularly adapted for use in a vehicle such as an automobile.

Various proposals have been made with respect to hydraulic dampers of the adjustable damping force type since it is preferable to change the damping force characteristics of the hydraulic dampers in a suspension system of a vehicle such an an automobile in response to the running condition of the vehicle, such as running on a rough road, running on a paved road at a relatively low speed, running at a high speed and the like, which can improve driving comfort and steering stability.

This invention relates to a hydraulic damper of the adjustable damping force type including a cylinder containing hydraulic liquid therein, a piston working in the cylinder and partitioning the interior thereof into two liquid chambers, a piston rod connected to the piston and extending through one of the liquid chambers to the outside of the cylinder, a coaxial bore formed in the piston rod, a liquid passage for communicating the two liquid chambers and including at least a portion of the bore, an adjusting rod inserted into the coaxial bore and adapted to be operated rotatably from the outside of the damper, and a rotary valve secured to the adjusting rod and having a plurality of circumferentially spaced and radially extending orifices having different diameters for selectively changing the effective passage area of the liquid passage, thereby adjusting the damping force.

One prior art hydraulic damper of the aforementioned kind further comprises a check valve which is resiliently displaceable in the axial direction. The check valve opens, e.g. during the contraction stroke of the damper, to increase the effective passage area and closes during the extension stroke of the damper, thereby reducing the effective passage area.

However, when the check valve is axially displaceably provided the overall axial length of the damper tends to increase and, when the check valve is provided to cooperate with the rotary valve an axial force will act on the rotary valve, particularly when the check valve is in the closed condition thus increasing the force required to operate the check valve. Further, the check valve usually consists of a valve body and a coil spring for biasing the valve body against a valve seat, thus increasing the number of parts and complicating the manufacturing and assembling operation, thereby increasing costs.

SUMMARY OF THE INVENTION

The object of the present invention is to solve the aforementioned problems, and according to the invention there is provided a hydraulic damper of the aforementioned kind, wherein a check valve is provided on the rotary valve to rotate integrally therewith in the circumferential direction. The check valve opens to permit the liquid to flow through a selected orifice during either one of the contraction and extension strokes of the damper and closes during the other of the contraction and extension strokes of the damper. The check valve has small diameter orifices at locations aligned with reflective orifices in the rotary valve.

According to a preferred embodiment, the check valve radially inwardly displaces against a resilient force during the contraction stroke of the damper to permit the liquid flow determined by either one of the first orifices of the rotary valve and, during the extension stroke of the damper, the check valve is urged against the inner circumference of an orifice tube by its own resilient force and the hydraulic pressure acting on the check valve and restricts the liquid flow in the liquid passage by either one of the second orifices.

BRIEF DESCRIPTION OF THE DRAWINGS

The invention will hereinafter be explained in detail with reference to the accompanying drawings illustrating four preferred embodiments of the invention, and in which.

DETAILED DESCRIPTION OF THE PREFERRED EMBODIMENTS

FIG. 1–FIG. 5 shows a hydraulic damper according to the first embodiment of the invention and, which comprises a cylinder 1 containing hydraulic liquid therein, a piston 5 working in the cylinder 1 and partitioning the interior of the cylinder 1 into two liquid chambers A and B, and a piston rod 2 secured to the piston 5 and extending through the liquid chamber A and to the outside of the damper through one end (not shown) of the cylinder 1. The hydraulic damper may be of a single tube type wherein a free piston (not shown) is slidably provided in the cylinder 1 to partition the liquid chamber B from a gas chamber (not shown), or may be of a dual tube type wherein an outer tube (not shown) coaxially encircles the cylinder 1 to define an annular reservoir chamber containing therein pressurized gas and hydraulic liquid.

Figure 1:
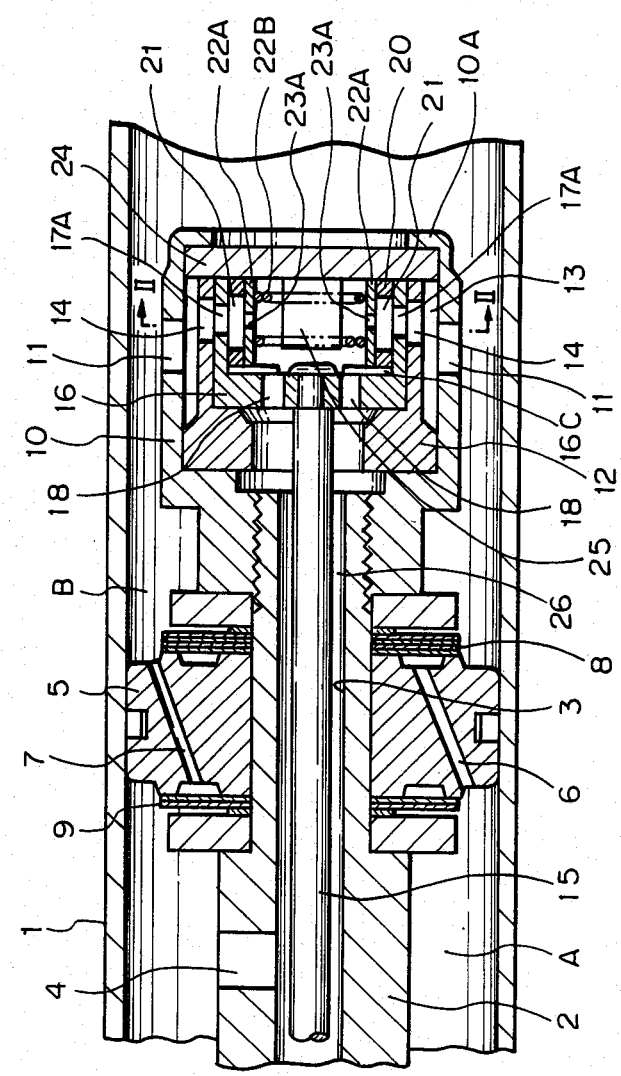
FIG. 1 is a longitudinal sectional view showing the essential portion of a hydraulic damper according to a first embodiment of the invention.

An coaxial bore 3 is formed in the piston rod 2, and at least one radial hole 4 communicates permanently the liquid chamber A with the bore 3. A damping force generating valve mechanism consisting of through holes 6 and 7 axially extending through the piston 5, a disc valve 8 normally preventing liquid flow through the holes 6 (FIG. 1 shows only one hole 6, but a plurality of circumferentially spaced holes 6 is provided), and a disc valve 9 normally preventing liquid flow through the holes 7 is provided on the piston 5 to generate a main damping force during both the extension and contraction strokes of the damper.

A tubular member 10 is screw-threadingly connected to one end of the piston rod 2 and acts also to secure the piston 5 to the piston rod 2. Two diametrically opposed holes 11 are formed in the circumferential wall of the tubular member 10. A guide tube 12 is secured to the inner circumference of the tubular member 10 by such as force fitting and the like. An annular groove 13 is formed in the other circumference of the guide tube 12 to act as a liquid passage, and two diametrically opposed holes 14 are formed in the circumferential wall of the guide tube 12 at locations corresponding with respective holes 11 in the tubular member 10.

Figure 2:
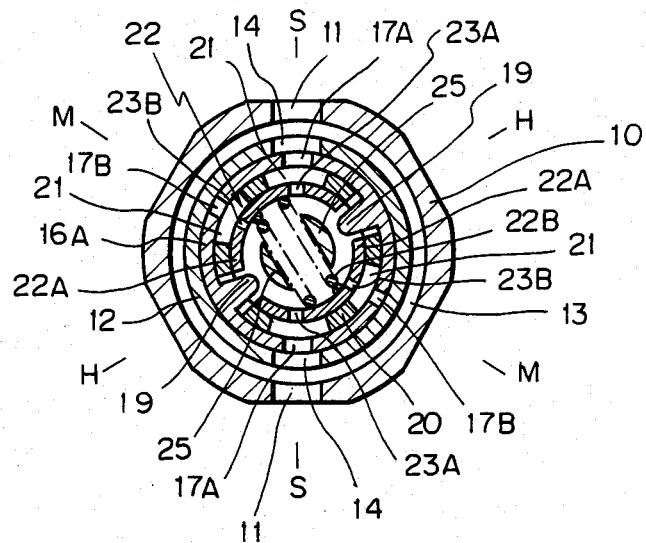
FIG. 2 is a sectional view taken along line II—II in FIG. 1.
Figures 3, 4:
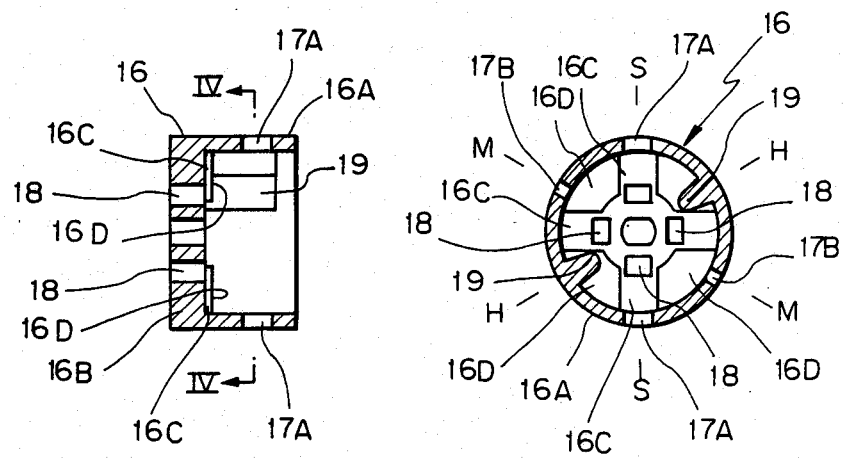
FIG. 3 is a longitudinal sectional view of a rotary valve shown in FIG. 1.
FIG. 4 is a sectional view taken along line IV—IV in FIG. 3.
Figure 5:
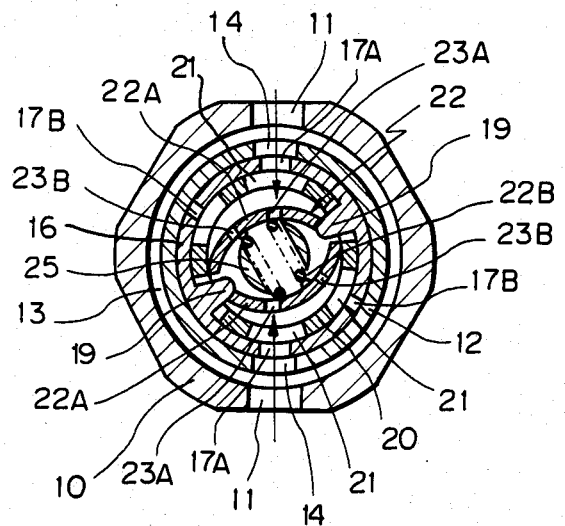
FIG. 5 is a view similar to FIG. 2 but showing an operated condition.

An adjusting rod 15 extends through the bore 3 in the piston rod 2, and one end of the adjusting rod 15 extends into the guide member 12 and the other end (not shown) sealingly extends through the bore 3 to the outside of the damper and is connected to a suitable operating device (not shown) such as an electric motor or the like. A rotary valve 16 is secured to the adjusting rod 15 by such as caulking or the like with the outer circumference thereof being slidingly and rotatably guided by the inner circumference of the guide member 12. As shown in FIGS. 2-4, the rotary valve 16 consists generally of a circumferential wall 16A and an end wall 16B, and generally crosswise radially extending grooves 16C are formed in the inner surface of the end wall 16B. The grooves 16C define therebetween rand surfaces 16D which act to guide the sliding movement of a check valve 22 as will be explained hereinafter. There are formed in the circumferential wall 16A of the rotary valve 16 relatively large diameter orifices 17A for generating a damping force during the contraction stroke of the damper and relatively small diameter orifices 17B for generating a damping force during the extension stroke of the damper. The orifices 17A are diametrically opposed, and the orifices 17B are also diametrically opposed and angularly spaced from respective orifices 17A by 60 degrees. The orifices 17A and 17B are referred generically as orifices 17. The rotary valve 16 is selectively rotated between three equally angularly spaced positions, i.e. a soft position S-S wherein the large diameter orifices 17A generally align with respective holes 14 in the guide member 12, a medium position M-M wherein the small diameter orifices 17B align generally with respective holes 14 and a hard position H-H wherein the holes 14 in the guide member 12 are closed by the circumferential wall of the rotary valve 16. These three positions are spaced by 60 degrees from each other.

Further, holes 18 are formed in the end wall 16B of the rotary valve 16 at locations corresponding to respective grooves 16C. Two diametrically opposed and radially inwardly projecting ridge 19 and 19 are formed in the circumferential wall 16A of the rotary valve 16 to act as stops for circumferentially locating the check valve 22 as will be explained hereinafter.

A generally cylindrical valve seat 20 is fitted in the inner circumference of the rotary valve 16 by such as force fitting and the like. Relatively large holes 21 are formed in the valve seat 20 at locations corresponding to respective orifices 17. Rotation or movement in the circumferential direction of the valve seat 20 with respect to the rotary valve 16 is prevented by stops 19.

The check valve 22 is disposed on the inner circumference of the valve seat 20 to cooperate therewith. The check valve 22 consists of a pair of generally semi-circular arcuate valve bodies 22A and a coil spring 22B acting between valve bodies 22A. In the closed condition of the check valve 22 as shown in FIG. 2, there is some amount of clearance between each circumferential end of the valve bodies 22A and the stops 19 and, in the valve open condition shown in FIG. 5, the radially inward movement of the valve bodies 22A is restricted by the stops 19. There are provided in each of the valve bodies 22A a relatively large diameter orifice 23A and a relatively small diameter orifice 23B at locations corresponding to or generally aligning with the orifices 17A and 17B, respectively, in the rotary valve 16. The orifices 23A and 23B are referred to generically as orifices 23. The effective passage area of the orifices 23 is smaller than that of the orifices 17. The orifices 23 act to generate a damping force during the extension stroke of the damper.

A bottom cap 24 is secured to the tubular member 10 by such as caulking or the like and acts to locate the guide member 12 in the tubular member 10 and to separate the interior of the guide member 12 from the liquid chamber B. A pair of spring guides 25 projects in the axial direction from the inner surface of the bottom cap 24.

An annular liquid passage 26 is formed between the bore 3 and the adjusting rod 15 and is communicated permanently with the liquid chamber A through the hole 4 in the piston rod 2. Further, the liquid passage 26 is also communicated with the interior of the rotary valve 16 through holes 18.

The operation of the first embodiment of the invention will now be explained.

Firstly, the adjusting rod 15 is operated from the outside of the damper to rotate the rotary valve 16 together with the check valve 22 such that the orifices 17A and 23A in the rotary valve 16 and the check valve 22 generally oppose the holes 14 and 11 in the guide member 12 and the tubular member 10, respectively, thereby setting the soft position S-S.

During the extension stroke of the damper, the liquid in the liquid chamber A flows into the liquid chamber B through the hole 4 and the passage 26 in the piston rod 2, the holes 18 in the rotary valve 16, orifices 23A in the check valve 22, holes 21, orifices 17A in the rotary valve 16, holes 14 and annular passage 13 in the guide member 12, and holes 11 in the tubular member 10. The liquid passed through holes 18 presses the valve bodies 22A of the check valve 22 radially outwardly against the inner surface of the valve seat 20. The passage area of orifices 23A is smaller than that of orifices 17A, thus a damping force generates from the resistance of liquid passing through orifices 23A. When the speed of the piston 5 exceeds a predetermined level, the disc valve 8 opens to generate a predetermined damping force.

During the contraction stroke of the damper, the pressure in the liquid chamber B as compared with the liquid chamber A increases and, as the result, the liquid in the chamber B flows into the chamber A through the holes 11, the annular passage 13, the holes 14, orifices 17A, holes 21, orifices 23A, holes 18, the passage 26 and the hole 4. However, at this condition, the liquid passed through holes 21 in the valve seat 20 presses the valve bodies 22A radially inwardly against the spring force of the spring 22B to form the condition shown in FIG. 5. Thus, the liquid passed through the holes 21 mainly flows from the space between the valve seat 20 and the valve bodies 22A to the holes 18 in the rotary valve 16 through grooves 16C in the rotary valve 16. The orifices 17A act to define the damping force under this condition. When the speed of the piston 5 exceeds a predetermined level, the disc valve 9 opens to determine the damping force at this condition.

Next, when the rotary valve 16 is rotated by 60 degrees in the clockwise direction with respect to FIG. 2 to set the medium position M-M so that the orifices 17B align with the holes 14 in the guide member 12, the damper acts similarly to the above discussed soft condition S-S.

Further, when the rotary valve 16 is rotated by 60 degrees in the clockwise direction from the medium condition M-M to the hard condition H-H, no liquid flows between the chambers A and B through the passage 26, and the damping force is determined by disc valve 8 or 9.

According to the invention, the check valve 22 is disposed to move in the radially inward and outward directions, thus, it is possible to reduce the axial length of the damper.

Further, even though a hydraulic pressure acts on the check valve 22 during the extension stroke of the damper, the hydraulic pressure simply acts to tightly engage the valve bodies of the check valve against the valve seat 20 in the radially outward direction, and the valve bodies 22A and the valve seat 20 rotate integrally with the rotary valve 16, so that no axial force acts on the rotary valve, and thus, the torque required for rotating the rotary valve can be minimized.

Further, the check valve 22 consists of two arcuate valve bodies 22A and a spring 22B, and thus, assembling operation is easy and the manufacturing cost is low.

Figure 6:
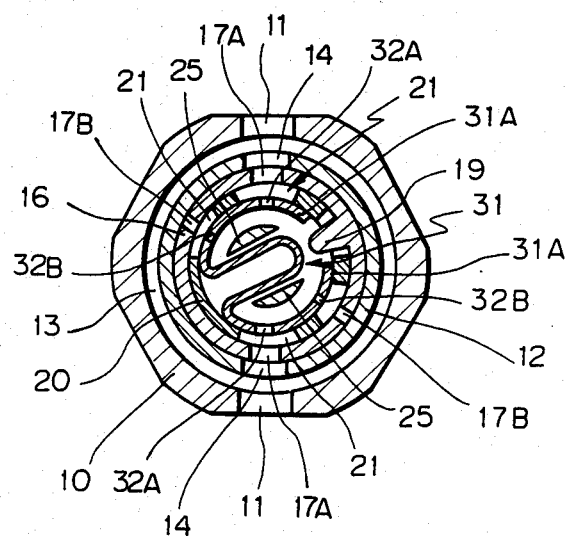
FIG. 6 is a view similar to FIG. 2 but showing a second embodiment of the invention.

FIG. 6 shows the second embodiment of the invention. The check valve 22 in the first embodiment is modified to an integral valve member 31 having a pair of generally arcuate valve portions 31A, and a generally U-shaped resilient connecting portion connecting first ends of the valve portions 31A. The valve member 31 is preferably formed of a sheet metal. As shown in FIG. 6, one of the stops 19 in the first embodiment is omitted, and orifices 32A and orifices 32B are provided in the valve portions 31A. The operation of the second embodiment is similar to that of the first embodiment.

Figure 7:
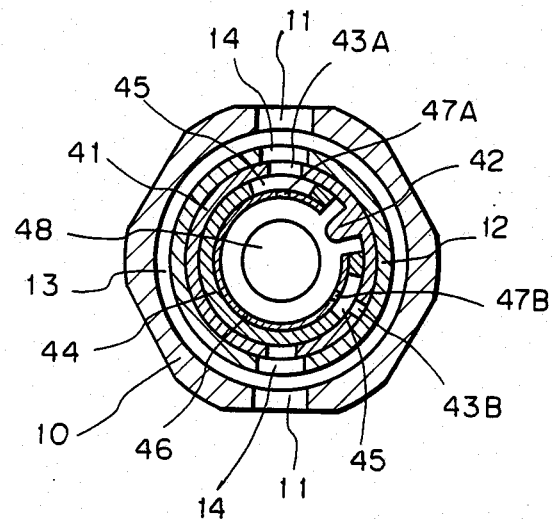
FIG. 7 is a view similar to FIG. 2 but showing a third embodiment of the invention.

FIG. 7 shows the third embodiment of the invention. The check valve in this embodiment consists of an integrally formed, generally C-shaped resilient member 46 preferably formed of a sheet metal. The check valve 46 is radially outwardly pressed by its own resiliency against a valve seat 44 of a generally C-shaped configuration. The check valve 46 and the valve seat 44 are located on the inner circumference of a rotary valve 41 having a radially inwardly projecting and axially extending stop 42 on the inner circumference thereof. The stop 42 extends into the opening defining the C-shape in each of the check valve 46 and the valve seat 44. Only one large diameter orifice 43A and one small diameter orifice 43B are formed in the rotary valve 41 which are respectively spaced circumferentially from the stop 42 by 60 degrees. Corresponding orifices 47A and 47B and holes 45 are formed in the check valve 46 and the valve seat 44. Shown at numeral 48 in FIG. 7 is a guide integrally projecting from the bottom cap 24.

According to this embodiment, the orifices 47A and 47B are provided adjacent to opposite free ends of the check valve 46, and thus, it is possible to equalize the lift and the valve closing force of the check valve 46 between the soft and medium conditions.

It will be understood that it is possible to provide two or more orifices 47A or 47B at axially spaced positions.

Figure 8:
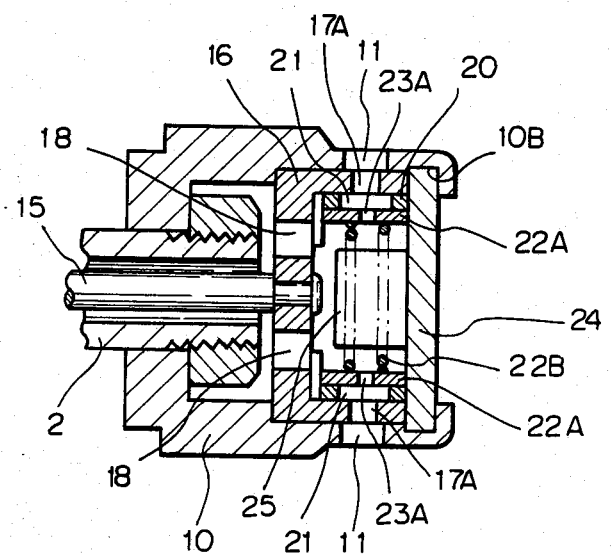
FIG. 8 is a partial longitudinal sectional view of a fourth embodiment of the invention.

Accordingly to the fourth embodiment shown in FIG. 8, the guide member 12 in the first embodiment is omitted, and the rotary valve 16 is directly inserted in the tubular member 10. The bottom cap 24 is located in an annular groove 10B in the inner circumference of the tubular member 10 and slidably engages with the rotary valve 16. As compared with the first embodiment, it is possible to increase the diameter of the rotary valve 16, thus, the orifices 17 and 23 can easily be formed.

In the embodiments aforementioned, the rotary valve is disposed in a tubular member which is connected to the tip end of the piston rod, but the check valve may be provided midway of the length of the piston rod.

As described heretofore, according to the invention, it is possible to reduce the axial length of the adjustable damping force generating mechanism, thereby decreasing the overall axial length of the hydraulic damper. Further, it is possible to prevent unbalanced hydraulic force acting on the rotary valve, thereby reducing the operating force necessary to rotate the rotary valve. Further, the check valve is assembled on the inner circumference of the rotary valve thereby improving the assembly operation, and the construction is simple, thereby improving productivity and reducing costs.

What is claimed is:

1. In a hydraulic damper of adjustable damping force type including a cylinder containing hydraulic liquid, a piston working in said cylinder and partitioning the interior thereof into first and second liquid chambers, a piston rod connected to said piston and extending through said first liquid chamber to the outside of said cylinder, a coaxial bore formed in said piston rod, a liquid passage communicating said liquid chambers and including at least a portion of said bore, an adjusting rod inserted into said coaxial bore and adapted to be operated rotatably from the outside of the damper, and a generally cylindrical rotary valve secured to said adjusting rod and having a plurality of circumferentially spaced and radially extending first orifices having different diameters for selectively changing the effective passage area of said liquid passage, thereby adjusting the damping force, the improvement comprising:

check valve means, mounted at the inner circumference of said rotary valve for rotation integrally therewith, and having a plurality of circumferentially spaced and radially extending second orifices having different diameters and aligned with respective said first orifices, the size of each said second orifice being smaller than the size of the respective aligned first orifice, for opening radially inwardly during one of the contraction or extension strokes of the damper, thereby allowing fluid flow through a selected said first orifice, and for closing radially outwardly during the other of the contraction or extension strokes of the damper, thereby restricting the fluid flow by a selected said second orifice.

2. The improvement claimed in claim 1, wherein said check valve means comprises a pair of arcuate valve bodies cooperating with said inner circumference of said rotary valve, and spring means for biasing said valve bodies in radially opposite outward directions against said inner circumference of said rotary valve.

3. The improvement claimed in claim 1, wherein said check valve means comprises a resilient plate member normally engaging with said inner circumference of said rotary valve by its own resiliency.

4. The improvement claimed in claim 1, wherein said check valve means closes during the extension stroke of the damper.

* * * * *